United States Patent
Ahmed

(10) Patent No.: US 10,463,196 B2
(45) Date of Patent: Nov. 5, 2019

(54) CHARCOAL STARTER WITH IMPROVED PERFORMANCE

(71) Applicant: W.C. BRADLEY CO., Columbus, GA (US)

(72) Inventor: Mallik Ahmed, Columbus, GA (US)

(73) Assignee: W.C. Bradley Co., Columbus, GA (US)

( * ) Notice: Subject to any disclaimer, the term of this patent is extended or adjusted under 35 U.S.C. 154(b) by 0 days.

(21) Appl. No.: 15/400,133

(22) Filed: Jan. 6, 2017

(65) Prior Publication Data
US 2017/0188752 A1    Jul. 6, 2017

Related U.S. Application Data

(60) Provisional application No. 62/275,590, filed on Jan. 6, 2016.

(51) Int. Cl.
*A47J 37/00* (2006.01)
*A47J 37/07* (2006.01)

(52) U.S. Cl.
CPC ................... *A47J 37/079* (2013.01)

(58) Field of Classification Search
CPC ..................................................... A47J 37/079
USPC ............................... 126/25 B, 25 R, 29, 9 R
See application file for complete search history.

(56) References Cited

U.S. PATENT DOCUMENTS

| | | | |
|---|---|---|---|
| 2,939,773 A | 6/1960 | Rymer | |
| 3,848,577 A | 11/1974 | Storandt | |
| 4,026,265 A | 5/1977 | Spadaro | |
| 4,227,510 A | 10/1980 | Frazier et al. | |
| 5,197,455 A | 3/1993 | Tessien | |
| 5,469,835 A * | 11/1995 | Stephen | A47J 37/079 126/146 |
| D497,772 S | 11/2004 | Bodum | |
| 2007/0119444 A1 | 5/2007 | Yoon et al. | |
| 2008/0230044 A1* | 9/2008 | Warner | A47J 37/079 126/25 B |
| 2013/0042852 A1* | 2/2013 | Cottrell | A47J 37/079 126/25 B |

FOREIGN PATENT DOCUMENTS

FR    2744618    8/1997

OTHER PUBLICATIONS

PCT/US2017/012493, WO, W.C. Bradley Co, International Search Report and Written Opinion of the ISA.
"Char-Broil Half-Time Charcoal Starter" (Char-Broil Grills), Apr. 27, 2016, youtube.com<URL:https://www.youtube.com/watch?v=)axdjKlh_JY>.

* cited by examiner

*Primary Examiner* — Vivek K Shirsat
(74) *Attorney, Agent, or Firm* — David G. Woodral; GableGotwals

(57) ABSTRACT

A solid cooking fuel starter having a cylindrical wall defining an interior of a cylinder, and a baffle dividing the interior of the cylindrical wall into upper and lower chambers. A first plurality of apertures is defined in the baffle and a second plurality of apertures is defined through the cylindrical wall into the lower chamber. A ratio of a width of the upper chamber to a height from the baffle to a top of the cylindrical wall, may be greater than about 1.69 to 1.

16 Claims, 6 Drawing Sheets

CHARCOAL STARTER WITH IMPROVED PERFORMANCE

CROSS-REFERENCE TO RELATED CASES

This application claims the benefit of U.S. provisional patent application Ser. No. 62/275,590, filed on Jan. 6, 2016, and incorporates such provisional application by reference into this disclosure as if fully set out at this point.

FIELD OF THE INVENTION

The present disclosure relates to outdoor cooking in general and, more particularly, to a device for preparing charcoal for use in cooking.

BACKGROUND OF THE INVENTION

Quick and inexpensive lighting techniques for solid charcoal cooking fuels have been sought for some time. Devices have been developed with electrical heating elements and/or fans to improve heating and oxygen flow to increase the rate of ignition. The use of liquid hydrocarbon accelerants (e.g., charcoal lighter fluid) continues to be popular as well.

Certain canister-type starters are also known in the art such as U.S. Pat. Nos. 5,469,835 and 4,227,510. Devices such as these provide an upper and lower chamber separated by a partition supplied with through holes or openings to allow passage of gas. Combustible material such as crumpled newspaper is placed in the lower chamber and the charcoal to be ignited is placed in the upper chamber. After ignition of the material in the lower chamber, combustion begins at the lowest level of the charcoal in the upper chamber and progresses up until all the charcoal is in some stage of combustion. The contents are then discharged into the area of a barbecue grill designed to hold the charcoal and cooking is then commenced.

There are problems and shortcomings with all of the solutions on the market. Devices with auxiliary heating and forced airflow are relatively expensive and prone to failure due to the complicated nature of the devices (e.g., use of moving parts and/or electrical power). Liquid hydrocarbon accelerants are also an added cost and can alter the taste of the prepared food. Known canister-type charcoal starters normally take an unacceptably long time to attain combustion of an adequate number of charcoal briquettes (indeed, if this can even be achieved at all with known prior art devices).

What is needed is a system and method for addressing the above, and related, issues.

SUMMARY OF THE INVENTION

The invention of the present disclosure, in one aspect thereof, comprises a solid cooking fuel starter having a cylindrical wall defining an interior of a cylinder, and a baffle dividing the interior of the cylindrical wall into upper and lower chambers. A first plurality of apertures is defined in the baffle and a second plurality of apertures is defined through the cylindrical wall into the lower chamber. A ratio of a width of the upper chamber to a height from the baffle to a top of the cylindrical wall is greater than about 1.69 to 1.

In some embodiments, the upper chamber is less than about 4.625 inches from the baffle to a top of the cylindrical wall. In some embodiments, the fuel starter includes a third plurality of apertures defined through the cylindrical wall into the upper chamber. The third plurality of apertures may be located adjacent a lower portion of the upper chamber with no apertures are provided adjacent an upper portion of the upper chamber. The lower portion of the upper chamber may be defined as a lower half of the chamber and the upper portion of the upper chamber is defined as an upper half of the chamber.

Some embodiments include a handle attached to the cylinder wall. A heat shield may be provided interposing the handle and the cylinder wall.

The invention of the present disclosure, on another aspect thereof, comprises a solid cooking fuel starter with a cylindrical wall defining an interior of a cylinder, and a baffle dividing the interior of the cylindrical wall into upper and lower chambers. A first plurality of apertures are defined the baffle and a second plurality of apertures defined through the cylindrical wall into the lower chamber. A third plurality of apertures are defined through the cylindrical wall into the upper chamber.

The third plurality of apertures may be confined to a lower half of the upper chamber and the cylindrical wall adjacent. In such case the upper portion of the upper chamber may be solid.

In some embodiments, a ratio of a width of the upper chamber to a height from the baffle to a top of the cylindrical wall is greater than about 1.69 to 1. The upper chamber may be less than about 4.625 inches from the baffle to a top of the cylindrical wall.

Some embodiments include a handle attached to the cylinder wall on an outside thereof opposite the interior and possibly a heat shield interposing the handle and the cylinder wall.

The invention of the present disclosure, in another aspect thereof, includes a fuel starter with a circular cylindrical wall having an open top and bottom, and a baffle inside the cylinder demarcating and upper chamber and a lower chamber. The circular cylindrical wall defines a first plurality of apertures into the lower chamber. A ratio of a width of the upper chamber to a height from the baffle to a top of the cylindrical wall is greater than about 1.69 to 1. The upper chamber is less than about 4.625 inches from the baffle to a top of the cylindrical wall.

The fuel starter may further include a second plurality of apertures defined in the cylindrical wall into the upper chamber. The second plurality of apertures may be confined to a lower half of the upper chamber with an upper half of the upper chamber being substantially solid. In another embodiment, the first and second sets of apertures are continuously spaced from top to bottom on the cylindrical wall.

DETAILED DESCRIPTION OF THE PREFERRED EMBODIMENTS

It has been found that an analytical understanding of the combustion process of a vertical stack of solid fuel can lead to a change in geometric parameters of a cylindrical canister-type charcoal starter that yields a significant and remarkable improvement in performance. (It will be understood that the use of the word cylinder should imply various extended cross sections including but not limited to circles, ovals, squares, rectangles and other topologically equivalent figures.) The fundamental analytic understanding is that the initiation of combustion at the bottom layer produces an atmosphere in the layers above that is progressively depleted of oxygen available to support initiation of combustion. In fact, the further developed the fire at the bottom layers, the more oxygen is used up in the hot gases going vertically up through the cylinder.

It is often impossible to obtain full combustion initiation of the very top layer of charcoal no matter how prolonged the process as a considerable fraction of the atmospheric oxygen taken into the canister has been converted to carbon dioxide. In fact for a given type of charcoal, such as the 2 inch by 2 inch by 1 inch ovoid briquettes commonly found in the US market, there is a maximum vertical distance through the stack of fuel which can create full combustion initiation and full involvement of all the charcoal in short period of time. Once this maximum vertical distance is found then the desired volume to be contained is established by an increase in diameter, thus yielding a cylindrical can with a greater ratio of diameter to height than has heretofore been practiced.

It has been found that apertures in the cylinder walls are beneficially extended along the upper chamber to allow additional oxygen to be pulled in to the vertical stack of solid fuel. Repeated tests have shown remarkable results with starting times being reduced by half or more. These tests, as well as background for the analytical understanding, will be covered in more detail following the description of the various embodiments of the present disclosure.

Figure 1:
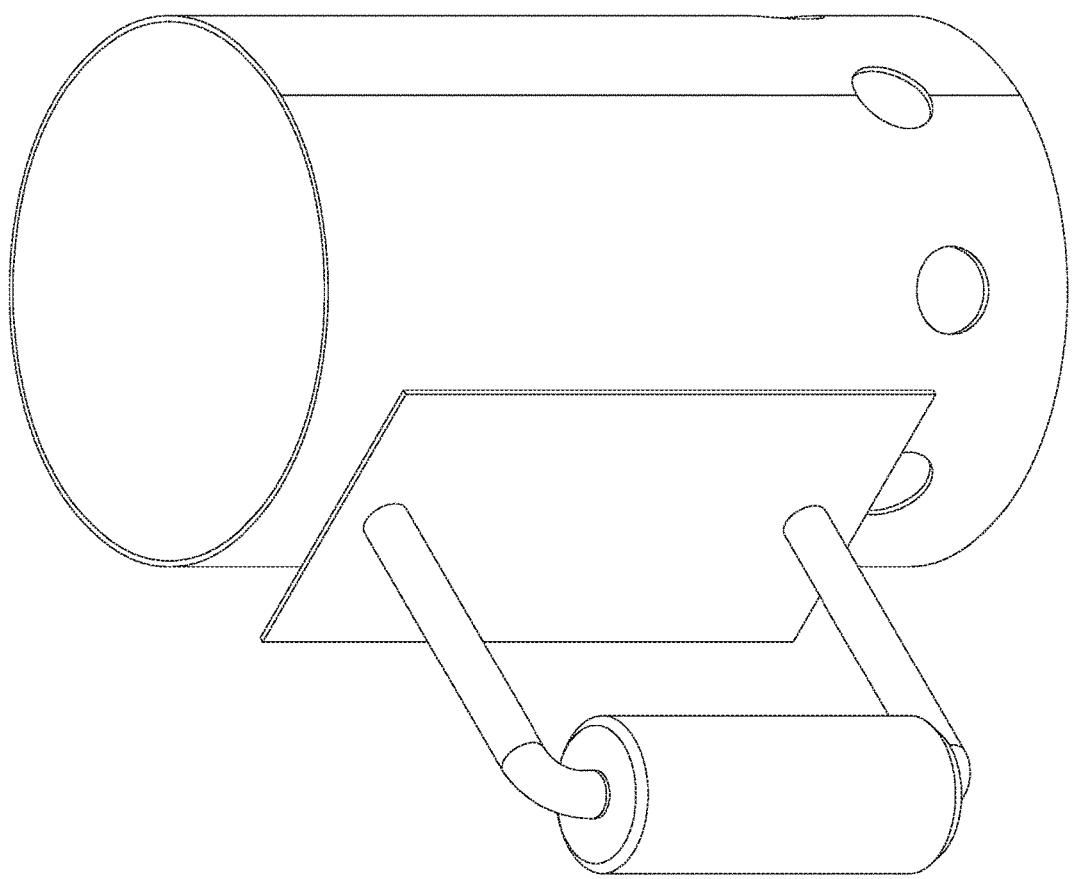
FIG. 1 is a perspective view of a canister-type charcoal lighter.
Figure 2:
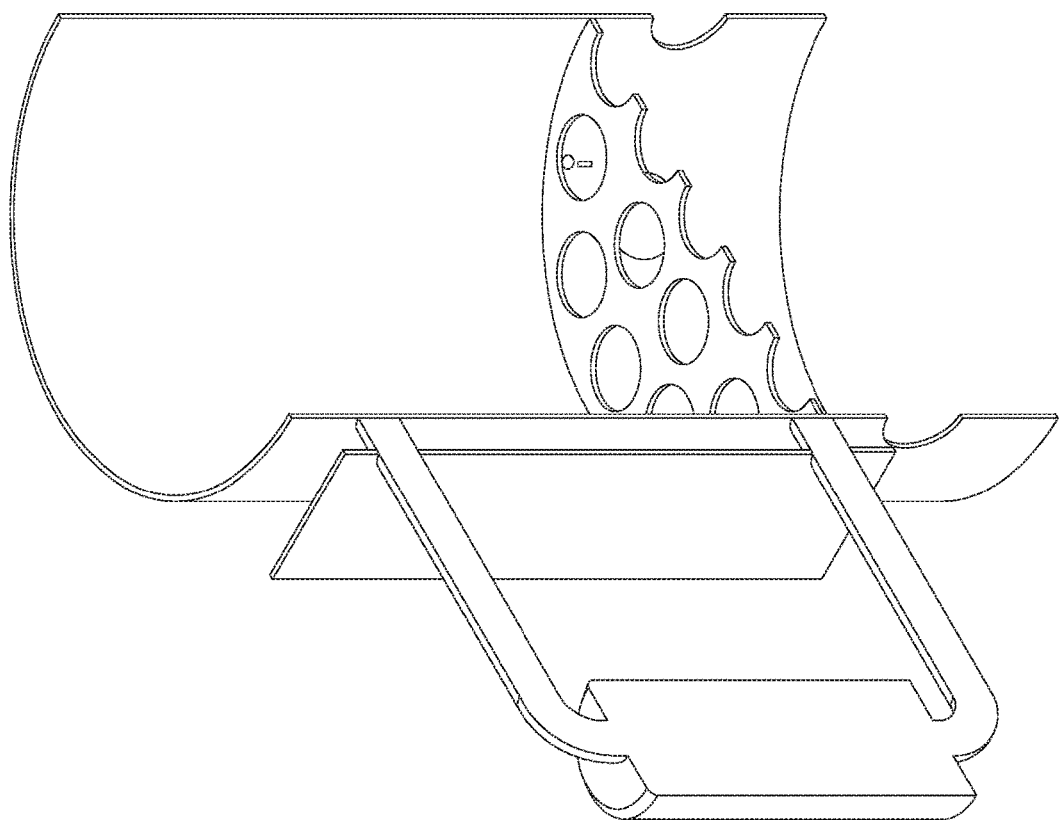
FIG. 2 is a perspective cutaway view of the canister-type charcoal lighter of FIG. 1.

FIG. 1 is a perspective view of a canister-type charcoal lighter. A cutaway perspective view is shown in FIG. 2. Note that this canister-type lighter is relatively tall compared to its width and provides openings through the canister walls only into the lower chamber.

Figure 3:
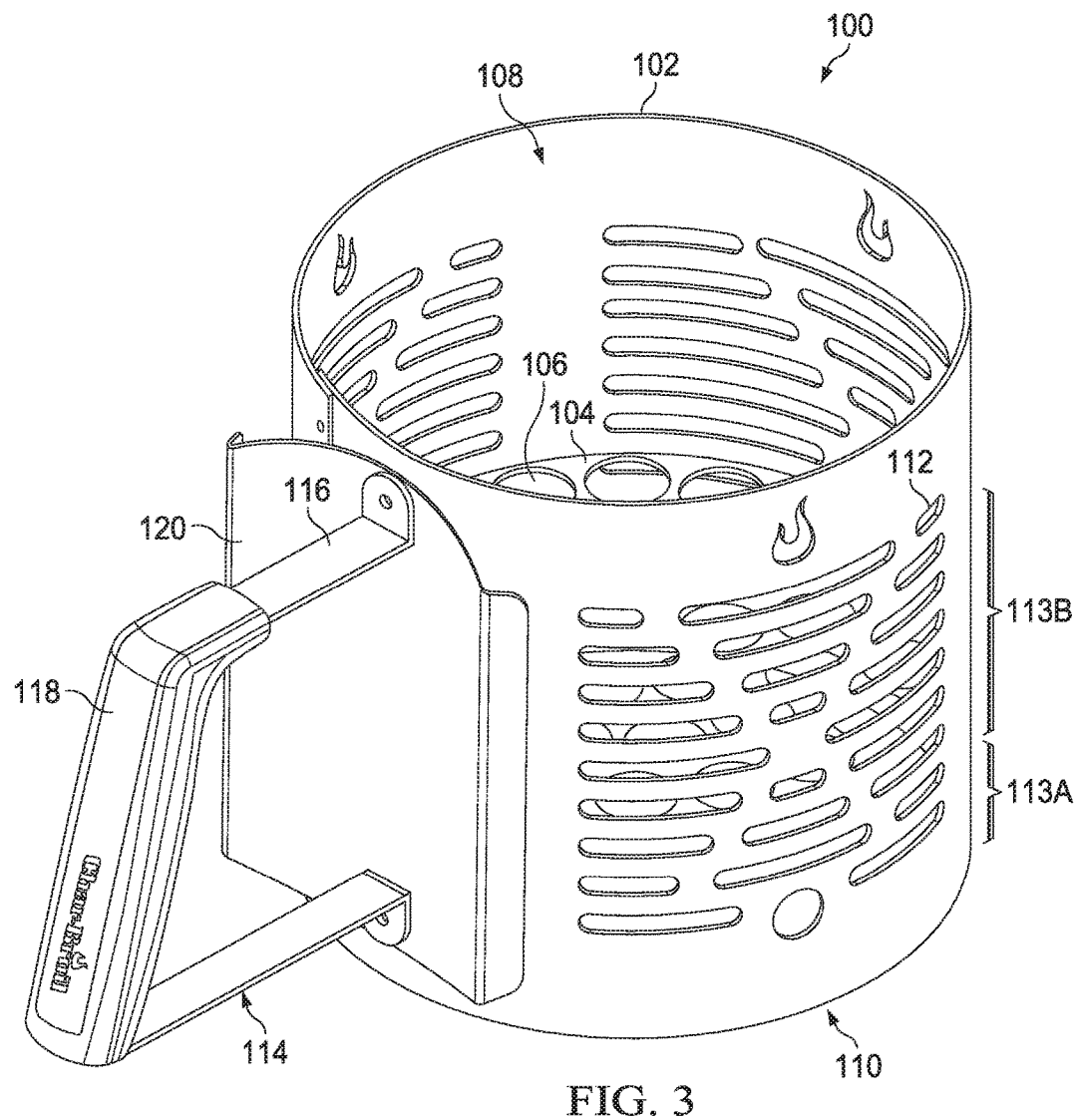
FIG. 3 is a perspective view of a charcoal lighter according to aspects of the present disclosure.
Figure 4:
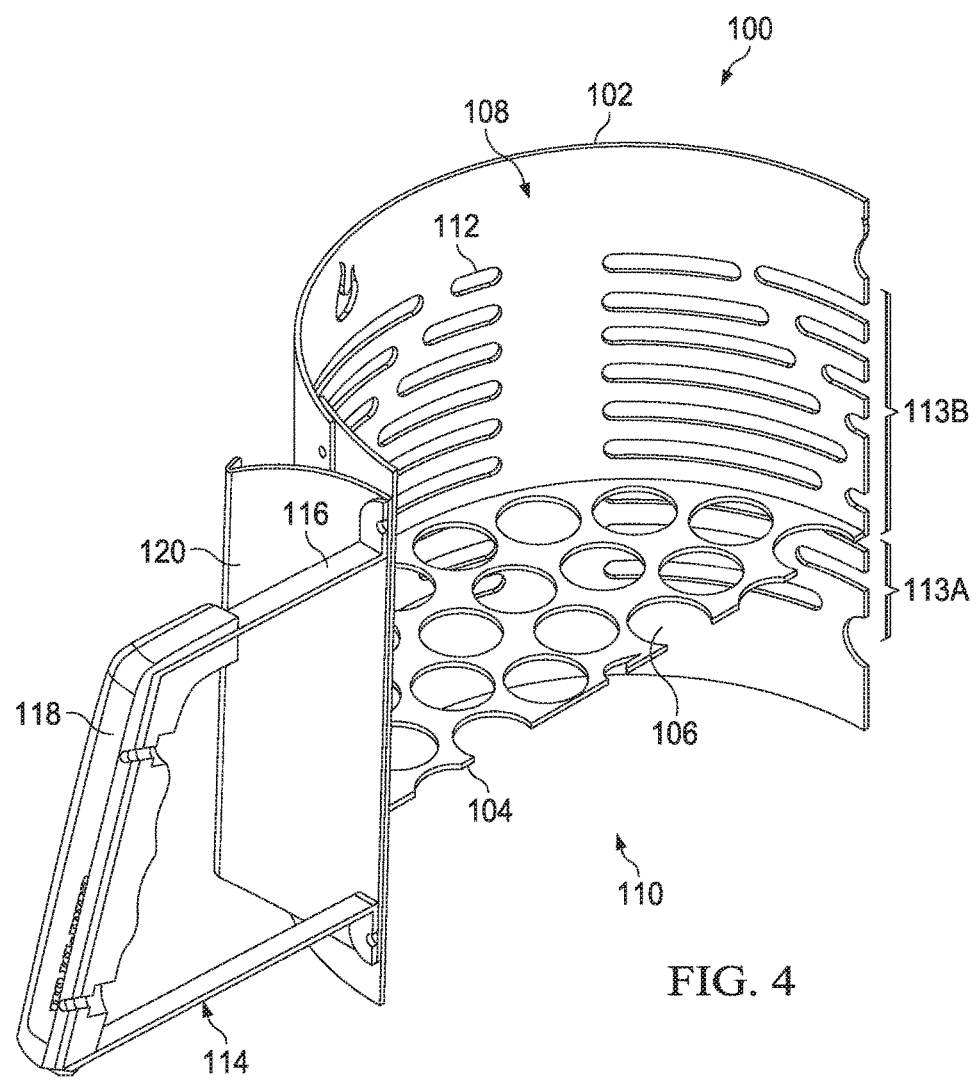
FIG. 4 is a cutaway perspective view of the charcoal lighter of FIG. 3.

Referring now to FIG. 3, a perspective view of a charcoal lighter according to aspects of the present disclosure is shown. FIG. 4 is a cutaway perspective view of the charcoal lighter of FIG. 3. The lighter 100 comprises a continuous cylinder 102 with a baffle 104 placed at or below a midline (from top to bottom) of the cylinder 102. The baffle 104 defines a plurality of apertures 106 to allow the flow of gas between an upper chamber 108 and a lower chamber 110 defined within the cylinder 102 and above and below the baffle 104, respectively.

In some embodiments there are apertures 112 of various configurations defined in the walls of the cylinder 102 leading into both the upper chamber 108 and the lower chamber 110. These apertures 112 provide combustion air for the paper (or other starter material, not shown) in the lower chamber 110 and the charcoal (not shown) in the upper chamber 108. In one preferred embodiment, the height of the upper chamber 108 is no more than 4.625 inches and the ratio of the diameter of the cylinder 102 to the height of the upper chamber 108 is equal to or greater than 1.69 to 1. Stated another way, the width of the upper chamber 108 is at least 1.69 times the size of the height.

Other dimensions and embodiments are possible within the scope of the present disclosure. For example, the volume of the upper chamber 108 may be increased by increasing the diameter or width of the chamber 108. The height of the chamber 108 is somewhat limiting in that heights substantially greater than 4.625 inches begin to cause loss of efficacy. In taller chambers, the uppermost of the charcoal briquettes will not be ignited or started before those nearer the bottom of the chamber are unacceptably consumed. In addition to an upper limit in chamber height for most sizes of charcoal that is around 4.625 inches, the width should remain at least 1.69 times the height for maximum effect.

The apertures 112 may be considered to comprise a first set 113A below the baffle 106 and a second set 113B above the baffle 106. In some cases, the first set 113A and second set 113B may be continuous so as to form an equidistantly spaced procession of apertures from top to bottom. In some embodiments, the apertures 112 extend to near the top of the cylindrical wall 102. In other embodiments the apertures stop some distance before the top of the cylindrical wall 102 (e.g., approximately one inch, or the height of a standard charcoal briquette). The apertures 112 may be ovals of varying sideways lengths (e.g., FIGS. 3-4) or may have other repeating and substantially identical shapes per set (e.g., FIG. 5).

A handle 114 may be placed on the outside of the cylinder 102 and may comprise a metal bracket 116 and a non-metallic gripping surface 118 which is used to manipulate the lighter 100. A heat shield 120 may interpose the handle 114 and the cylinder 102.

The baffle 104 between the upper chamber 108 and lower chamber 110 may be formed by a metallic plate with through holes, by wires with significant openings between them or any other mechanically appropriate way to separate the starting material below from the charcoal fuel above and allow the flame and hot gas from the starting material to ignite the charcoal fuel.

The dimensions of the lighters of the present disclosure were not established by iteration, but rather based on the notion that a shorter vertical height of the solid fuel stack would result in less pressure drop in the vertical buoyancy driven flow of hot gas. This creates a greater flow of hot gas to the upper layers of solid fuel. The shorter vertical height places the upper layers of solid fuel in an area where the combination of available oxygen and temperature is more favorable to rapid initiation of combustion.

The effect of these developed physical dimensions was demonstrated experimentally in a test where a first cylinder with an upper chamber of 6.375 inches diameter and 7 inches height (and therefore with an upper chamber volume of 223.4 cubic inches) was compared to a second cylinder with an upper chamber of 7.813 inches diameter and 4.625 inches height (and therefore with an upper chamber volume of 221.7 cubic inches). Both were filled with the same amount of charcoal briquettes and were lit with newspaper placed in the lower chamber of both. Between 12.5 minutes and 13 minutes a temperature of 708° F. was measured with a contact thermocouple on a briquette at the top of the vertical stack of charcoal in the second cylinder. At this point, pale blue orange flames were fully developed through the top layer of briquettes. Between 13 and 13.5 minutes the same measurement was made on the first cylinder and the only 365° F. was observed and there were no visible flames appearing through the top layer of briquettes. After 21 minutes of operation the observed briquette temperature in the first cylinder was 670° F., still less than that seen with the second cylinder after 13 minutes. Repeated tests of various sizes and configurations of cylinders have produced equivalent results. Thus, even where the total volume of the upper chambers is similar, the ratios of height to width developed as described herein, results in a markedly improved performance both in terms of how quickly the charcoal becomes ignited, and in the ability to completely ignite the volume of charcoal.

Based on prior art designs and common understanding, it might be thought that changing from a tall thin geometry to a shorter broader geometry might be detrimental to performance because of the loss of the chimney effect. The chimney effect relates the pressure differential between the bottom and top of the duct to the height of the duct as well as the difference in temperature. If the cylindrical can had no fuel in it then that effect would be dominant. However the cylindrical can is full of what can be considered a porous media, the charcoal fuel. Therefore, a pressure drop is found that is proportional to the length of the media. This acts oppositely to the pressure difference created by the chimney effect. The present disclosure demonstrates that the pressure drop owing to the media exceeds the effect of the chimney effect in prior art designs-a problem that is overcome in the designs of the present disclosure.

Further to be considered are the presence and placement of apertures in the various positions of the cylinder wall 102. Below the level of the partition or baffle 106 separating the starter material from the charcoal fuel, plentiful apertures in the cylinder wall 102 of various kinds may be appropriate. In some embodiments, above the level of that separation the apertures are not fully extended up the walls of the cylinder, but may be confined to the lower half of the upper chamber 108 so that they supply further air inward through the wall 102 for combustion to the lower part of the fuel stack but are not placed so they would allow heated gas to escape outward through the wall 102 which would reduce the heating of the top layer of charcoal fuel. (Such an embodiment is shown, for example, in FIG. 5 where apertures 502 are confined to the lower half of the upper chamber 108 and the upper half of the upper chamber 108 is solid.)

Figure 5:
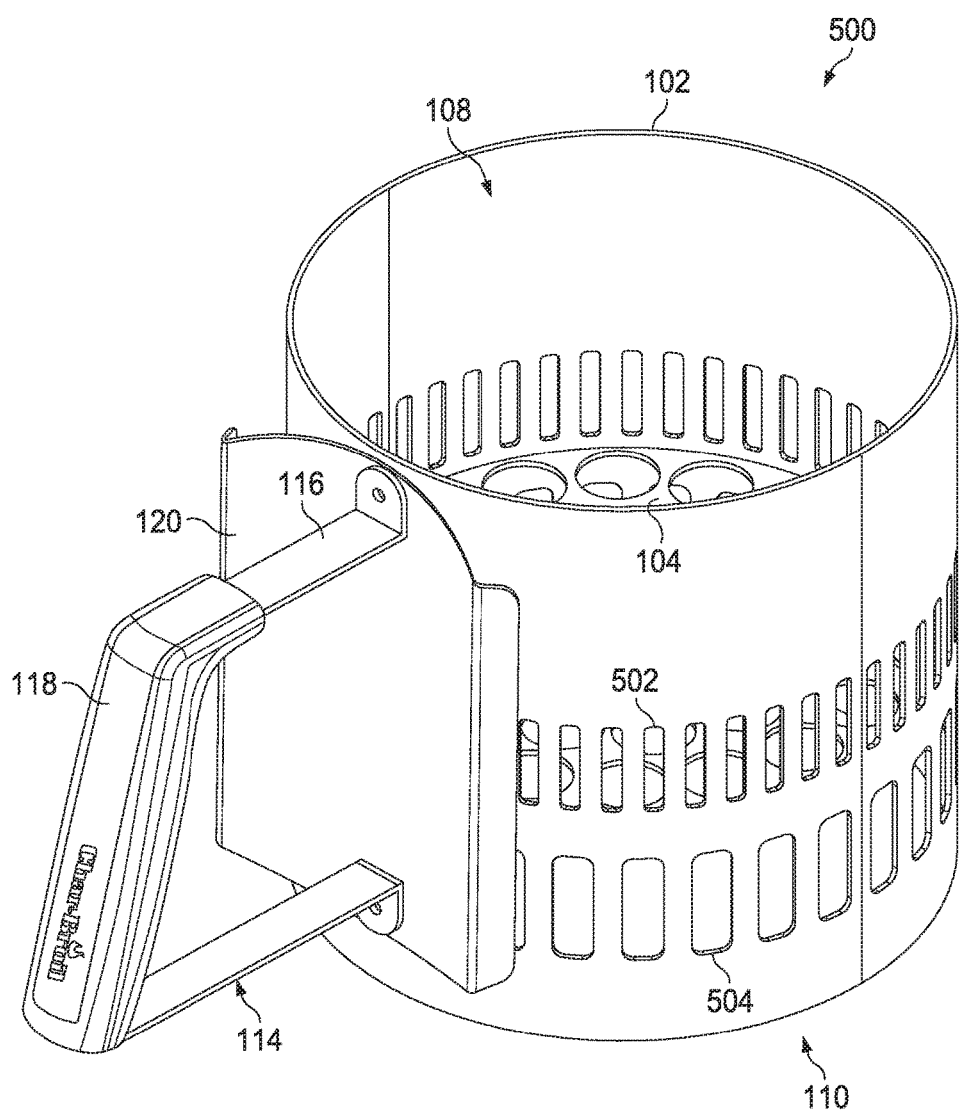
FIG. 5 is a perspective view of another embodiment of a charcoal lighter according to aspects of the present disclosure.

FIG. 5 illustrates an embodiment 500 in which apertures 502 (e.g., the second or upper set) leading to the upper chamber 108 are smaller and more closely spaced than apertures 504 (e.g., the first, or lower set) leading into the lower chamber 110. This is reflective of the fact that the different air flow rates appropriate for the different materials. The apertures 502, 504 shown in FIG. 4 have an upright rounded rectangular shape and each individual aperture per set is substantially identical in dimension to the others in the respective set (e.g., 502, 504).

Figure 6:
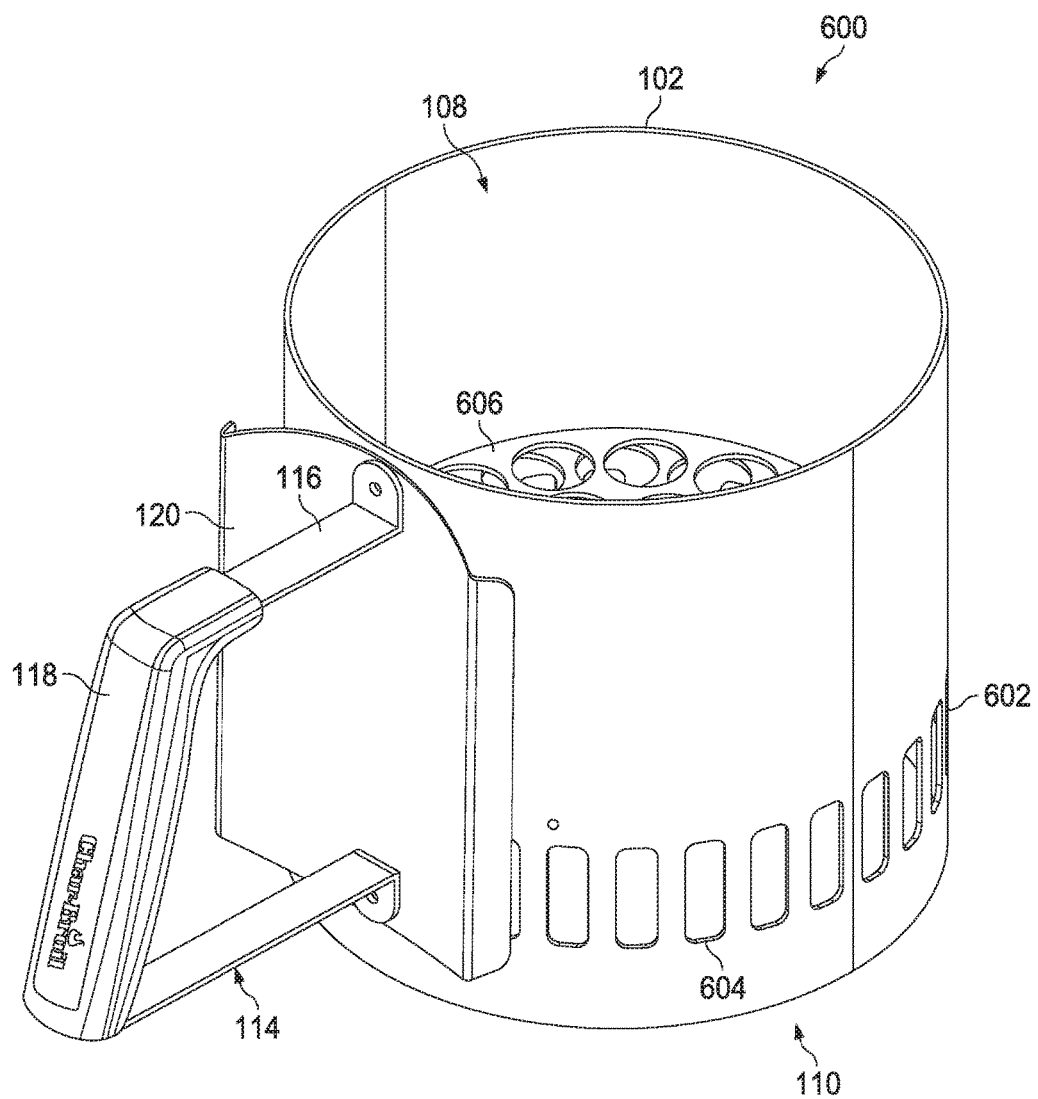
FIG. 6 is a perspective view of yet another embodiment of a charcoal lighter according to aspects of the present disclosure.

FIG. 6 illustrates an embodiment where apertures 604 leading through the wall 102 into the lower chamber 110 are the only apertures. The section of wall 102 demarcating the upper chamber 108 is solid.

The walls of the cylinder 102 may be formed of sheet metal or another suitably heat resistant material. The walls of the cylinder 102 may be rolled into shape and affixed together where the edges meet (e.g., by spot welding or the like). The handle 114 may be spot welded or riveted to the cylinder 102. Apertures (e.g., 112, 502, 504, 602, 604) may be punched or cut into the walls of the cylinder 102 either before or after the material is rolled into the cylindrical shape (for purposes of tooling, it may be preferred to punch holes before the walls are rolled).

The baffle 104 may be formed from the same material as the cylinder 102. It may be spot welded into place or affixed by another means. The apertures 106 defined in the baffle 104 may be cut or punched into the baffle 104 before or after assembly into the cylinder 102.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1or 0as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

* * *

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A solid cooking fuel starter comprising:
   a cylindrical wall defining an interior of a cylinder;
   a baffle dividing the interior of the cylindrical wall into upper and lower chambers;
   a first plurality of apertures defined in the baffle;
   a second plurality of apertures defined through the cylindrical wall into the lower chamber;
   wherein a ratio of a width of the upper chamber to a height from the baffle to a top of the cylindrical wall is greater than about 1.69 to about 1.

2. The fuel starter of claim 1, wherein the upper chamber is less than about 4.625 inches from the baffle to a top of the cylindrical wall.

3. The fuel starter of claim 1, further comprising a third plurality of apertures defined through the cylindrical wall into the upper chamber.

4. The fuel starter of claim 3, wherein the third plurality of apertures are located adjacent a lower portion of the upper chamber and no apertures are provided adjacent an upper portion of the upper chamber.

5. The fuel starter of claim 4, wherein the lower portion of the upper chamber is defined as a lower half of the upper chamber and the upper portion of the upper chamber is defined as an upper half of the upper chamber.

6. The fuel starter of claim 1, further comprising a handle attached to the cylinder wall.

7. The fuel starter of claim 6, further comprising a heat shield interposing the handle and the cylinder wall.

8. A solid cooking fuel starter comprising:
   a cylindrical wall defining an interior of a cylinder;
   a baffle dividing the interior of the cylindrical wall into upper and lower chambers;
   a first plurality of apertures defined in the baffle;
   a second plurality of apertures defined through the cylindrical wall into the lower chamber; and
   a third plurality of apertures defined through the cylindrical wall into the upper chambers;
   wherein a ratio of a width of the upper chamber to a height from the baffle to a top of the cylindrical wall is greater than 1.69 to 1.

9. The fuel starter of claim 8, wherein the third plurality of apertures are confined to a lower half of the upper chamber.

10. The fuel starter of claim 9, wherein the cylindrical wall adjacent an upper half of the upper chamber is solid.

11. The fuel starter of claim 8, wherein the upper chamber is less than about 4.625 inches from the baffle to a top of the cylindrical wall.

12. The fuel starter of claim 8, further comprising a handle attached to the cylinder wall on an outside thereof opposite the interior.

13. The fuel starter of claim 12, further comprising a heat shield interposing the handle and the cylinder wall.

14. A fuel starter comprising:
   a circular cylindrical wall having an open top and bottom; and
   a baffle inside the cylinder demarcating and upper chamber and a lower chamber;
   wherein the circular cylindrical wall defines a first plurality of apertures into the lower chamber;
   wherein a ratio of a width of the upper chamber to a height from the baffle to a top of the cylindrical wall is greater than about 1.69 to about 1; and
   wherein the upper chamber is less than about 4.625 inches from the baffle to a top of the cylindrical wall.

15. The fuel starter of claim 14, further comprising a second plurality of apertures defined in the cylindrical wall into the upper chamber.

16. The fuel starter of claim 15, wherein the second plurality of apertures are confined to a lower half of the upper chamber and an upper half of the upper chamber is substantially solid.

* * * * *